Dec. 24, 1946.   G. A. SMITH   2,413,005
WELL SURVEYING INSTRUMENT
Filed Oct. 23, 1941   2 Sheets-Sheet 1

WITNESS:

INVENTOR
George A. Smith
BY
ATTORNEYS.

Dec. 24, 1946.　　　　　G. A. SMITH　　　　　2,413,005
WELL SURVEYING INSTRUMENT
Filed Oct. 23, 1941　　　　2 Sheets-Sheet 2

WITNESS:
Robt R Mitchel

INVENTOR
George A. Smith
BY
Busser & Harding
ATTORNEYS

Patented Dec. 24, 1946

2,413,005

UNITED STATES PATENT OFFICE 2,413,005

WELL SURVEYING INSTRUMENT

George A. Smith, Philadelphia, Pa., assignor to Sperry-Sun Well Surveying Company, Philadelphia, Pa., a corporation of Delaware Application October 23, 1941, Serial No. 416,209

3 Claims. (Cl. 33—205.5)

This invention relates to a well surveying instrument and relates to improvements therein directed to the attaining of records of inclination and/or azimuth without the use of timing means.

Photographic instruments for well surveying at present in commercial use have the disadvantage of requiring timing means for controlling the period of illumination of a lamp by batteries during a recording period. Such timing means, because they must be embodied in a quite small space, are generally the source of much mechanical and electrical trouble requiring frequent repairs. Additionally, they offer a disadvantage in operation in that after having set the timing means for a given delay before the lamp or lamps are illuminated, the operated, even though the instrument reaches the point of recording substantially before the period of delay elapses, must wait for the remainder of the period of delay in addition to the recording period before the instrument may be withdrawn. Inasmuch as accidents arising during the lowering of the instrument may cause the lowering operation to be prolonged beyond a normal expectation, the delay period of the apparatus must be set to take care of accidental occurrences, with the result that the over-all time taken for a survey generally averages considerably longer than would be required if the operator could be assured that everything would occur without delay.

It is the broad object of the present invention to provide a well surveying instrument capable of recording inclination and azimuth, or both, which requires no timing means and consequently requires the exercise of no care to take care of contingencies tending to slow down operation unless and until contingencies occur. The instrument is adapted, furthermore, for the production of a series of records, even though it is of single shot nature (i. e., not involving a record member or film which is moved between successive exposures).

Briefly stated, the instrument involves the use of luminescent material, the action of which on a photographic emulsion is variable in accordance with the position of the instrument and which is sufficiently slow so that during motion of the instrument during raising or lowering in a hole, there is no definite marking produced beyond a fogging of the emulsion, while if the instrument is at rest for a prolonged period, of, say, one minute or more, a record exposure is produced. The luminescent material used is preferably of the radioactive type, though as will be pointed out hereafter, phosphorescent materials are also usable.

The objects of the invention just indicated, as well as other objects, will become apparent from the following description, read in conjunction with the accompanying drawings, in which.

Figure 1:
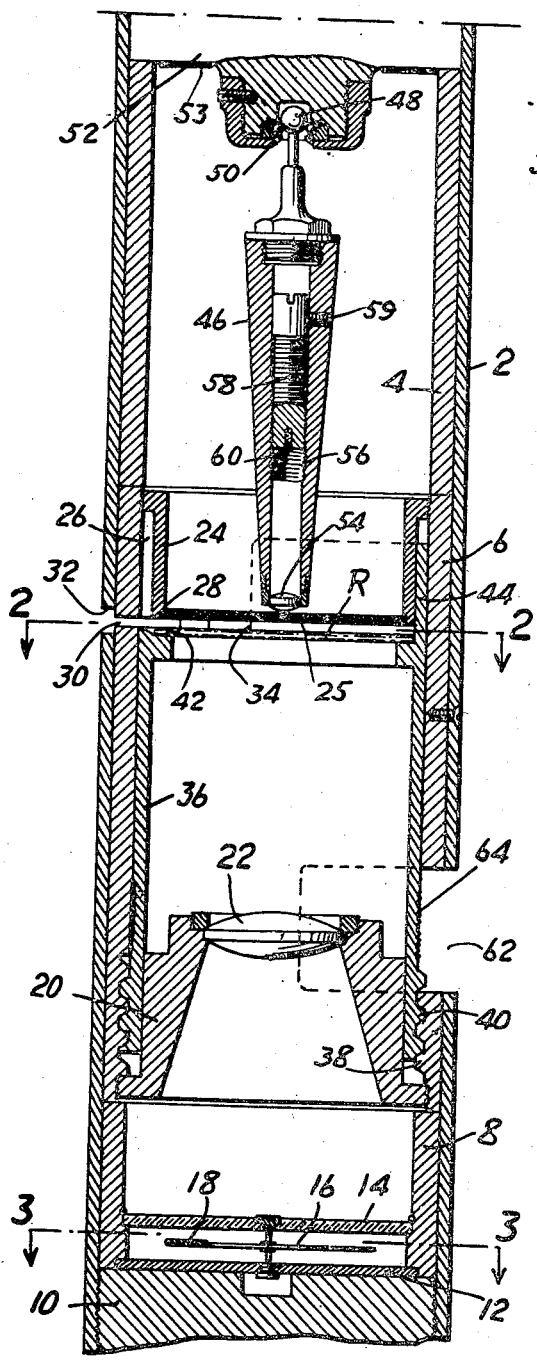
Figure 1 is an axial section through a portion of a well surveying instrument embodying the invention.

Referring first to Figure 1, there is illustrated therein the preferred form of instrument embodying the invention. The instrument shown is, of course, designed to be enclosed in a protective casing of conventional type which need not be illustrated, which protective casing is adapted to be lowered on a wire line or drill stem, or to be dropped through a drill stem in go-devil fashion and, if the instrument is designed to indicate azimuth, is of non-magnetic material. The inner casing of the instrument comprises a tube 2 which may be closed at its upper and lower ends, respectively, by members 10 and 52. In the present instance, since timing means and batteries are unnecessary, this inner instrument proper may be substantially shorter than instruments generally in use heretofore.

Within the tube 2 there are located a plurality of tubes, indicated at 4, 6 and 8, respectively, which abut each other between the plugs 10 and 52. The tube 8 carries a bottom plate 12 of a compass chamber the top of which is provided by a transparent glass plate indicated at 14. In bearings located in the top and bottom plates of this chamber is a compass 16, on one end of which, for example, the north pole, there is painted an arrow 18 through the use of a luminescent paint.

Threaded in the lower end of the tube 6 is a mounting 20 for a projection lens 22, the nature of which will be disclosed hereafter.

In the upper end of the tube 6 there is threaded a sleeve member 24 providing a clearance space indicated at 26 and carrying at its lower end a glass plate 25 on the lower surface of which there are preferably inscribed blackened concentric circles, as will be described hereafter, the disc being otherwise transparent. The bottom face of the disc is preferably substantially flush with an abutment lower edge of the member 24.

Figure 2:
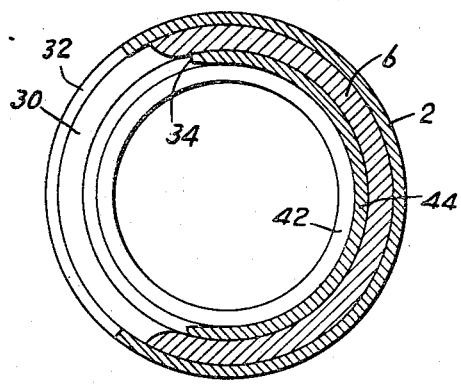
Figure 2 is a transverse section taken on the plane indicated at 2—2 in Figure 1.
Figure 3:
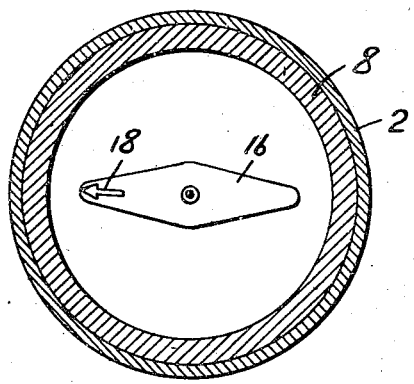
Figure 3 is a transverse section taken on the plane indicated at 3—3 in Figure 1.

The record disc R, preferably of a heavy transparent film of nitrocellulose or cellulose acetate carrying a photographic emulsion on its upper surface, is adapted to be inserted into the instrument through aligned slots 30 and 32 in the tube 6 and the outer tube 2, respectively. The slot 30 preferably terminates substantially short of 180°, as indicated in Figure 2.

Adapted to rotate and also slide within the tube 6 is a closure tube 36, the lower end of which is threaded with coarse threads, as indicated at 40, engaging similar threads 38 formed at the bottom of the tube 6. Extending inwardly of tube 36 is a seat, indicated at 42, designed to receive the record disc R, while extending upwardly beyond the seat through somewhat more than 180° is an extension 44 of the tube 36 arranged to be received within the space 26 and having its forward edges indicated at 34, approximately adjacent the ends of the slot 30 when the instrument is open to receive or discharge the record disc.

A pendulum 46 is mounted in a universal bearing arrangement, indicated at 48 and 50, carried by the upper plug 52. The body of the pendulum is hollow and supported at its lower end is a lens 54. The upper portion of the hollow bore of the pendulum is threaded as indicated at 56, and in this there is received a threaded plug 58 adapted to be secured in fixed adjusted position by a set screw 59 and carrying in a small bore therein a luminescent material 60, also in the form of a luminous paint. A ring of luminous material, indicated at 53, but having a luminosity substantially less than the material of the markings 18 and 60, may be painted about the periphery of the plug 52.

In the operation of this device, it is initially open, as indicated in Figure 1. A suitable loading device of the type commonly used in connection with photographic surveying instruments is then applied to the slots 30 and 32 and manipulated to project through the slots and upon the seat 42 a record disc R. Before removing the loading device, and while it maintains a light-tight cooperation with the instrument, the member 36 is rotated through approximately 180° by the operator, who may grasp the knurled portion 64 thereof through the slot 62 in the tubes 2 and 4. By reason of the provision of threads 40, this rotation of the tube 36 will cause it to move upwardly to press the record disc above the abutment edges 28 and closely adjacent the circular markings on the glass plate 25. At the same time, the extension 44 of the tube 36 will be rotated across the slots 30 and 32. From the construction described and illustrated, it will be evident that this closes the inner portion of the apparatus completely against the entrance of light, so that the loading device may then be removed. This closing arrangement is somewhat similar in principle to that described in Hewitt Patent No. 2,116,350 and may take various forms. Following this operation, the instrument is located in its protective casing, whereupon it may be lowered into the hole on a wire line or drill stem or dropped through a drill stem in go-devil fashion.

So long as the instrument is in motion, as it passes downwardly, or later upwardly, through the hole, the pendulum 46 and compass 16 will be moving relatively to the casing, with the result that no part of the emulsion on the record member will be exposed sufficiently long to the image of any of the markings to produce a record of inclination or direction. However, if the instrument is held at a fixed position of rest for a sufficient period, a recording exposure will be made by projection of the image of the luminescent material 60 on the film by the lens 54 and of the luminescent marking 18 on the compass by the lens 22.

The making of records in this fashion is thoroughly practical with materials readily available on the market. Using, for example, as the luminescent material the type of radioactive lacquer commonly used for the marking of clock and instrument dials for visibility in the dark, and using an emulsion on the transparent base of the record member of the type commonly used at present for high speed panchromatic films, an exposure of as little as 30 seconds will be sufficient upon development to give a perfectly distinct marking using a lens having a nominal relative aperture of f:2.5.

In the case of the lens 22, which projects the image of the luminescent arrow 18 through the back of the film upon the emulsion, the arrangement illustrated is such that an image is produced in slightly less than a 1 to 1 ratio, i. e., with a slight reduction of size. In such case, of course, the effective aperture of the lens is decreased from its nominal one and this must be taken into account in determining the minimum position of rest which will produce the desired density of image. While with a compass it is generally desirable to get as large an image as possible, this is not the case with the pendulum, and it is possible to secure a larger effective aperture for the lens and consequently a smaller lens for given conditions by spacing the glowing object spot 60 substantially farther from the lens than the corresponding image plane. In fact, if the spacing is such as to produce a projection ratio of about 8 to 1, the lens is substantially working at its full nominal aperture for all practical purposes.

While the record disc may be cut accurately to fit and seat in the holder, of the type illustrated or equivalent thereto, and the resulting record may be read with the assistance of a reading device into which the record may be fitted after development, it is sometimes desirable to provide for more direct reading, which also would make unnecessary the accurate fit of the record disc in the instrument, and while this expedient is unnecessary, the instrument of Figure 1 is shown as involving the marking on the record disc of concentric circles which may serve for the direct reading of the inclination in degrees. The printing of these circles may be effected by a slow fogging action of the record disc during the entire operation, whereby shadows of the circles may be marked thereon. For this purpose, a luminous material of considerably less luminosity than that at 60 and 18 may be provided, as described above, at 53. This will provide a general illumination which, through a prolonged period, may produce a fogging of the disc giving rise to a density upon development far less than that secured in the record markings, but of sufficient intensity to outline clearly the degree circles. Of course, the action of this fogging material will be slightly added to by the exposure over the area of the record disc due to the material at 60 and 18 during movement of the instrument. But this fogging is generally quite negligible unless the total period during which the record disc is in the instrument is very long compared with the periods of rest and recording.

Figure 4:
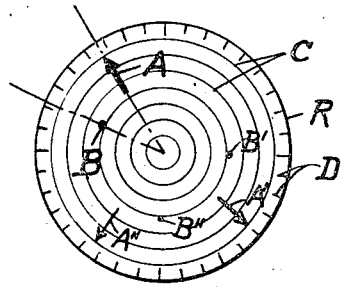
Figure 4 is a diagram illustrating the type of record which may be produced by the instrument.

The apparatus lends itself very effectively to the making of multiple records in accordance with the method disclosed in the application of Roland Ring, Serial No. 379,835, filed February 20, 1941. To secure multiple recording at different depths or for checking purposes at the same depth after rotation of the instrument, it is only necessary to hold the instrument at rest, to make the various recordings, for different periods of time. The record which is illustrated in Figure 4 is of this nature. In this case, the arrow A and the spot B projected from the luminescent arrow 18 and the luminous spot 60, respectively, were produced by the longest exposure. Images A' and B' were produced by a shorter exposure, and images A'' and B'' by a still shorter exposure. Upon development, these various sets of images may be readily distinguished by their varying densities, so that they may be paired up for measurement.

Figure 4, therefore, represents in a diagrammatic fashion the type of record obtained following development of the latent images produced in the emulsion during the operation. Of course, the lines C which will have been produced by contact printing will be white, while the entire disc will be fogged to a light gray substantially lighter, however, than the images of the arrow and dot. If it is desired to make the disc directly readable as to azimuth as well as inclination, equally spaced angle markings such as D may also be printed by contact on the disc, these markings being carried at the periphery of the glass disc 25. The angular spacing between the corresponding markings A and B may thus be conveniently measured without the use of a protractor or reading device. While the angular markings could be embodied directly on the compass disc and so printed by projection, if there are sufficient of them outlined in luminous material, the fogging may be so great during a prolonged operation as to make them relatively unreadable, and consequently, it is more desirable to provide arbitrary markings in the fashion described by contact printing through the use of a controlled fogging medium such as 53.

It may be remarked, incidentally, that it is desirable to cause the instrument to oscillate about its axis during lowering to prevent the luminous arrow 18 from being too much in approximately the same position so as to produce any substantial or objectionable fogging at any one portion of the record member. For this purpose, the usual rubber guides on the casing of the instrument may be made slightly spiral in form so as to cause the instrument to tend to turn with accompanying reverse rotation whenever it strikes some enlarged portion of the hole or a portion offering less resistance during its descent and ascent; in other words, spinning of the instrument to a moderate degree should be encouraged either by the expedient just mentioned or the choice of a wire line productive thereof.

It will be evident that the instrument in a simplified form involving the omission of the compass and the lens 22 will constitute an inclinometer in which only the angle of inclination will be measured by the deviation of the spot projected by the lens 54 from the center of the film. In this case, also, multiple records of inclination may be made by providing varying positions of rest, as described above.

While to avoid the necessity for additional manipulation the luminescent material used is preferably of a radioactive type which will remain luminous for a very long period of time, it is possible to use a phosphorescent material which will glow for a substantial period following exposure to daylight or strong artificial light. In such case, however, it is necessary that the instrument be taken apart to an extent sufficient to expose the luminescent material to exciting radiation. With the use of commercially available radioactive glowing material, consisting generally of a very small amount of radioactive substance combined with a fluorescent material in the form of a lacquer or paint, and with lenses of reasonable aperture and correction to provide recording in rest periods of the order of 1 to 5 minutes, quite high speed emulsions are required. If the luminosity of the material is greatly increased less sensitive developing-out emulsions are required, and with greatly increased intensity, it is even possible to utilize highly sensitive printing-out emulsions which may be read directly in subdued light without the necessity for a developing operation.

Figure 5:
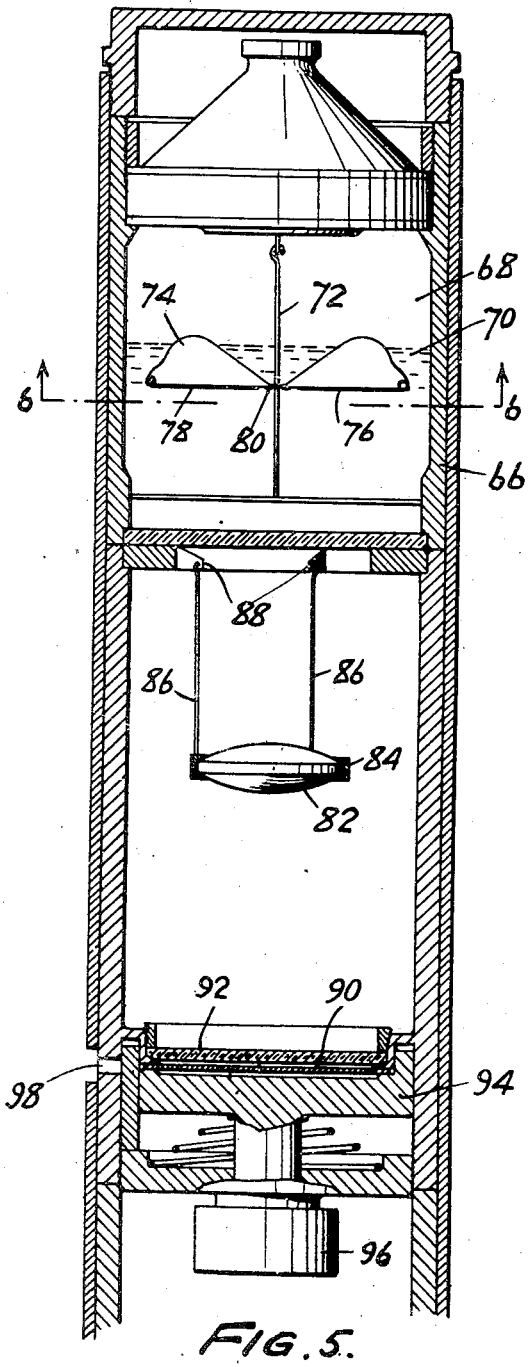
Figure 5 is a section of the type illustrated in Figure 1, but showing a modified form of instrument.
Figure 6:
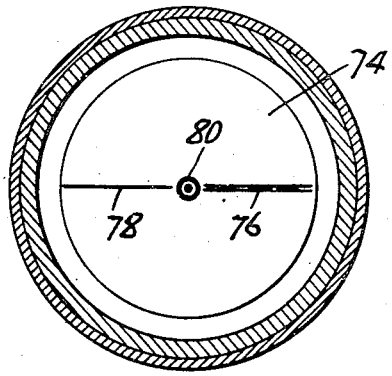
Figure 6 is a section taken on the plane indicated at 6—6 in Figure 5.

It will be evident that the recording of inclination and/or direction may be carried out in various fashions by the utilization of the luminescent material in accordance with the invention. As a further example of the application of the invention, reference may be made to the apparatus of Figure 5, which, it will be recognized, constitutes a revision of the type of apparatus disclosed in Hewitt Patent No. 2,116,350, dated May 3, 1938.

In this apparatus there is provided a chamber for a floating compass, indicated at 68, the side wall of which, 66, is in the form of a tube which is stacked together with other tubes in the inner casing of the apparatus. The liquid 70 floats a compass, diagrammatically indicated at 74, provided with suitable magnetic needles, which may be of semi-circular form, as disclosed, for example, in Hewitt et al. Patent No. 2,169,342, dated August 15, 1939. The compass is centrally guided by a wire 72 suitably mounted centrally of the compass chamber. The lower side of the compass is provided with markings such as indicated at 76, 78 and 80. These markings comprise, respectively, a double line at 76, indicating, for example, magnetic north, a single line 78 diametrically opposite the direction defined by the double line 76, and a central circular marking, indicated at 80, surrounding the opening in the compass. These markings are provided by luminous material, preferably of radioactive type as described above, but in this case, in order that the mark cover as little area as possible, they are desirably provided by causing the luminescent material to be exposed through transparent lines photographed on a film developed to a high contrast and density. In this fashion, there may be produced sharply defined luminous lines of far less thickness than can conveniently be provided by painting. The purpose of this will be evident hereafter in discussing the operation.

Suspended below the transparent bottom of the compass chamber is a lens 82 of large aperture carried in a ring 84, which is mounted to swing as a pendulum through the medium of thin rods or wires 86 supported by metal tongues 88 extending inwardly from a mounting ring. This pendulum suspension is such that the axis of the lens 82 will always remain parallel to the axis of the instrument irrespective of the inclination of the instrument.

A record disc 90, which may be in the form of a film carrying an emulsion, or paper or the like carrying an emulsion on its upper side (since in this case exposure from below is not necessary), is carried by a mounting arrangement indicated at 94 and adapted to be manipulated by a knob 96 similar to that described in said Hewitt patent referred to above. The record member 90 is located in the instrument through the slot 98 and is pressed upwardly adjacent to the glass disc 92, which may be provided with circular markings and/or peripheral markings in the fashion described in the other modification.

Figure 7:
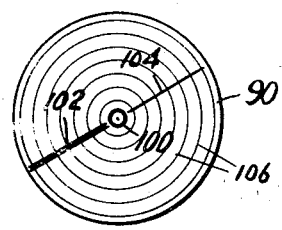
Figure 7 is a diagram illustrating the type of record produced by the instrument of Figure 5 when the instrument is substantially vertical.
Figure 8:
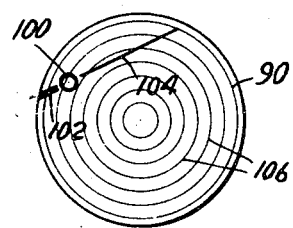
Figure 8 is a similar diagram showing the type of record produced when the instrument is inclined.

The type of record produced in this device is diagrammatically illustrated in Figures 7 and 8, which show the results of single recording, though it will be evident that multiple recording may be produced in the same fashion as described above. Figure 7 illustrates the record which would be obtained if the instrument was vertical, while Figure 8 shows a record obtained if the instrument is inclined. The markings 76, 78 and 80 will be projected as 102, 104 and 100, respectively, on the film, while markings carried by the glass disc 92 will be printed in the form of white lines on a gray background, as indicated at 106.

The azimuthal indication of the compass is projected directly on the record disc. The object of having lines extending in opposite direction to indicate the magnetic axis will be evident from consideration of Figure 8, from which it will be evident that if the inclination is sufficiently great to throw the circle 100 adjacent the edge of the disc, the greater part of one of the markings may be thrown off the disc, with the result that the other one will serve to give a more accurate indication of direction. The inclination will be given directly by the deviation of the image 100 from the center of the disc and is due to the fact that the image will be laterally displaced in accordance with the movement of the lens transversely of the axis of the instrument but to a magnified extent. The extent of such magnification, of course, depends upon the ratio of object to image size and the calibration of the circles 106, or the reading device, will, of course, be made to correspond.

In the case of this apparatus, the motion of the lens as movement takes place will produce fogging of the record disc by reason of the projection of the images of the markings 76, 78 and 80 throughout the area of the disc. It will also be noted that rays from these markings will bypass the pendulum, in its various positions during movement, directly to the disc and so produce additional fogging. Calculations will readily show that if the record image produced during a short period of rest, for example, of the order of 1 to 5 minutes, is to have a density substantially greater than the fog density produced during movements, say through a total period of thirty minutes or more, then the total luminous area provided by the markings 76, 78 and 80 may not be greater than some certain amount. For this reason, it is desirable that the lines constituting the markings shall have as little width as possible and in such case the lens 82 must be fairly well corrected to avoid loss of luminosity of the image due to various aberrations. The required conditions, however, may be quite readily met, and the limitations are by no means serious, though it is not desirable to provide, as is common in the case of compasses, calibrations throughout the entire periphery, since these would produce, over reasonably long periods, an objectionable degree of fogging which would render less readable the significant markings produced during recording.

While a magnetic compass has been described in each of the modifications disclosed herein, it will be obvious that the invention is applicable to the recording of azimuth by means of a gyroscopic compass, and a gyroscope is intended to be included within the scope of the word "compass."

It will be evident that the principles of the invention may be embodied in apparatus using various other optical systems and that the invention is applicable to well surveying instruments designed for tool orientation as well as those designed for tracing the path of a bore hole; for example, the invention is applicable to an instrument embodying a plurality of compasses or a plurality of pendulums for carrying out tool orientation operations in accordance with Hyer Patent No. 2,120,670, or an application of G. A. Smith, Serial No. 414,160, filed October 8, 1941.

What I claim and desire to protect by Letters Patent is:

1. A well surveying instrument comprising a casing adapted to enter a bore hole, means for supporting a sensitized record member within said casing, a compass within said casing, luminescent indicia carried by said compass, and a lens movable in accordance with inclination of said casing for projecting an image of said indicia upon said record member.

2. A well surveying instrument comprising a casing adapted to enter a bore hole, means for supporting a sensitized record member within said casing, a compass within said casing, means providing luminescent marking on said compass, and light ray focussing means to project an image of said marking variably upon said record member in accordance with the position of said casing relative to a magnetic field affecting said compass, said record member being exposed without interruption for any substantial time during an extended period of location of the instrument within a bore hole to the photographic action of said marking, but the intensity of said image being so low, and the area of said image relative to the total area swept by said image during movements of the casing being so small, that sufficient exposure of any portion of the record member to effect definite marking thereof occurs only when the instrument is at rest for a substantial sub-period of said extended period of time.

3. A well surveying instrument comprising a casing adapted to enter a bore hole, means for supporting a sensitized record member within said casing, a compass within said casing, means providing luminescent marking on said compass, and a lens movably mounted in said casing and arranged to assume positions dependent upon the inclination of the casing, said lens projecting an image of said marking variably upon said record member in accordance with the inclination of the casing and its position relative to a magnetic field affecting said compass, said record member being exposed without interruption for any substantial time during an extended period of location of the instrument within a bore hole to the photographic action of said marking, but the intensity of said image being so low, and the area of said image relative to the total area swept by said image during movements of the casing being so small, that sufficient exposure of any portion of the record member to effect definite marking thereof occurs only when the instrument is at rest for a substantial sub-period of said extended period of time.

GEORGE A. SMITH.